United States Patent
Aramatsu

(10) Patent No.: US 8,031,314 B2
(45) Date of Patent: Oct. 4, 2011

(54) COLOR LIQUID CRYSTAL DISPLAY PANEL

(75) Inventor: Yoshiaki Aramatsu, Tottori (JP)

(73) Assignee: Sony Corporation, Tokyo (JP)

( * ) Notice: Subject to any disclaimer, the term of this patent is extended or adjusted under 35 U.S.C. 154(b) by 1273 days.

(21) Appl. No.: 11/704,322

(22) Filed: Feb. 9, 2007

(65) Prior Publication Data

US 2007/0200993 A1  Aug. 30, 2007

(30) Foreign Application Priority Data

Feb. 24, 2006  (JP) .................. 2006-047842

(51) Int. Cl.
  *G02F 1/1345* (2006.01)
(52) U.S. Cl. .................. 349/149; 349/152; 349/192
(58) Field of Classification Search .................. None
  See application file for complete search history.

(56) References Cited

U.S. PATENT DOCUMENTS

| | | | | |
|---|---|---|---|---|
| 5,859,679 A | * | 1/1999 | Song | 349/54 |
| 6,300,998 B1 | * | 10/2001 | Aruga | 349/192 |
| 7,583,350 B2 | * | 9/2009 | Chang et al. | 349/153 |
| 2003/0011613 A1 | * | 1/2003 | Booth, Jr. | 345/589 |

FOREIGN PATENT DOCUMENTS

| | | |
|---|---|---|
| JP | 8-201843 A | 8/1996 |
| JP | 2001-183614 A | 7/2001 |

* cited by examiner

*Primary Examiner* — Lucy Chien
(74) *Attorney, Agent, or Firm* — K&L Gates LLP

(57) ABSTRACT

A color liquid crystal display panel includes a first substrate having data lines and scan lines arranged in a matrix, a second substrate having four-color filter segments to provide four sub-pixels forming a pixel, a frame-shaped sealing material through which the first and second substrates are bonded together, and a liquid crystal sealed in a gap surrounded by the first and second substrates and the sealing material. The data lines and the scan lines are drawn out of the sealing material and arranged as inspection data lines having a predetermined length. Among the inspection data lines $L_R$, $L_G$, $L_B$, $L_C$ corresponding to the four-color filter segments, at least one pair of the inspection lines for two colors sandwich one inspection data line for one color and have identical lengths. According to the above-described configuration, it is possible to provide a color liquid crystal display panel such that, even when the number of color filter segments per pixel is increased, the space where the inspection lines are provided to inspect the wiring condition on the display panel is not increased.

7 Claims, 11 Drawing Sheets

(prior art)

(prior art)

COLOR LIQUID CRYSTAL DISPLAY PANEL

FIELD OF THE INVENTION

The present invention relates to a color liquid crystal display panel for displaying color images. The invention particularly relates to a color liquid crystal display panel that allows a wiring inspection prior to mounting a semiconductor chip for driving the color liquid crystal display panel to be conducted with efficiency and ease.

BACKGROUND OF THE INVENTION

In recent years color liquid crystal display panels have been used as a display panel for information communications equipment as well as for general electric equipment. In such color liquid crystal display panels, a pair of transparent substrates are bonded together with a frame-shaped sealing material therebetween, and a liquid crystal is sealed in a gap surrounded by the pair of substrates and the sealing material. One of the pair of substrates is an array substrate that has on the inner surface thereof a plurality of data lines and scan lines (gate lines) arranged in a matrix. Further, a thin film transistor is connected to the intersection of each data line and scan line, and a pixel electrode is provided at the intersection. The other substrate is a color filter substrate that has on the inner surface thereof an opposed electrode, as opposed to the abovementioned pixel electrode, and a three-color filter including R (red), G (green), and B (blue).

On the array substrate, the respective ends of the data lines and the scan lines are drawn out of the sealing material. A mounting terminal for mounting a semiconductor element for driving a liquid crystal (referred to as "IC chip") is formed at the respective ends of these drawn-out lines. An IC chip is connected to each of these mounting terminals. A scan signal is in turn supplied to each scan line via the IC chip, and a data signal is supplied to each data line in synchronization with such scan signal supply. Thus the thin film transistor is turned on, displaying a color image.

Such a color liquid crystal display panel is subjected to an in-process inspection in which the wiring condition of each line, e.g., the presence or absence of a break or short circuit in each line, is checked, before IC chips are mounted on the panel (for example, see JP-8-201843-A).

FIG. 10 is an enlarged plan view of a part of inspection lines of a color liquid crystal display panel described in JP-8-201843-A.

In this color liquid crystal display panel 20, the data lines 22 for blue (B), the data lines 22 for green (G), and the data lines 22 for red (R) are drawn out of a side of a sealing material 21 by different lengths $L_1$ to $L_3$ ($L_1 > L_2 > L_3$), respectively. Similarly, scan lines 23 are drawn out of another side of the sealing material 21 by different lengths $L_4$ to $L_5$ ($L_4 > L_5$). Mounting terminals and 22a and 23a for mounting an IC chip are provided to the drawn-out data lines 22 and the scan lines 23, respectively. The extended ends of the drawn data lines 22 serve as inspection data lines 22R, 22G, and 22B (referred to as "inspection lines"). An in-process inspection, i.e., a lighting inspection of pixels is conducted by letting a connector touch these inspection lines.

In this lighting inspection, two connectors (first and second connectors (not shown)) are used. By disposing the first connector in the D position located on the scan lines 23, the scan lines 23 are connected to each other via the first connector. Then the lighting inspection is conducted as follows.

The second connector (now shown) is initially disposed in the A position. Disposing the connector in this position causes the connector to touch all the inspection lines 22, lighting all the pixels. If there are any pixels staying out, it can be detected that a data line is broken. Subsequently, moving the second connector to the B position causes the connector to touch the inspection lines 22B and 22G, lighting the blue and green pixels. At this point, if the red pixels are lit, it can be assumed that there is a short circuit between the data lines connected to the inspection lines 22B and 22R, or in a data line connected to the inspection lines 22R and 22G. Further, moving the second connector to the C position causes the connector to touch the inspection lines 22B alone, lighting the blue pixels and leaving the green and red pixels out. At this point, if the green pixels or the red pixels are lit, it can be assumed that a short circuit has occurred between the data lines connected to the inspection lines 22B and 22G.

In the color liquid crystal display panel described in JP-8-201843-A, the inspection lines 22R, 22G, and 22B consisting of the data lines drawn out of the sealing material 21 have different lengths depending on the color: red (R), green (G), or blue (B). Then, by moving the second connector to the three different positions A to C to conduct the lighting inspections for all and specific colors, the wiring condition of each data line is checked. However, when the length of the inspection line is changed depending on the color in this manner, for example, if the number of colors is increased, for example, to four colors: red (R), green (G), blue (B), and cyan (C), four inspection lines 22R, 22G, 22B, and 22C with different lengths from the sealing material 21 depending on the colors: red (R), green (G), blue (B), or cyan (C), are required. Consequently, the longest one (the inspection line 22C for cyan in FIG. 11) of the inspection lines consisting of the data lines drawn out of the sealing material 21 is extended further than the previous longest inspection line. Therefore, the space where the inspection lines are provided must be made larger than when the number of colors is three to a degree that the longest inspection line is extended further. Additionally, in the inspection method, the number of positions in which the connectors are placed is increased by one and thus becomes four, that is, the D position is added to the A to C positions. Therefore, when the number of color filter segments is increased in the related-art inspection method, it is necessary to increase the space where the inspection lines are provided as well as the number of man-hours for the inspection, requiring more inspection time.

In recent years, miniaturization and higher definitions have been required for this type of color liquid crystal display panels, particularly, ones that are used with cellular phones. Of these requirements, miniaturization has been addressed by devising a variety of methods, for example, making the frame narrower, laminating the peripheral wiring, or miniaturizing IC chips. Therefore, it is difficult to increase the space where the inspection lines are provided as described above. Further, when the larger number of man-hours for the inspection and more inspection time are required, the problem of reductions in panel productivity concurrently occurs.

SUMMARY

In view of the foregoing, the present invention provides a color liquid crystal display panel such that, even when the number of color filter segments per pixel is increased, the space where the inspection lines are provided to inspect the wiring condition on the display panel is not increased.

The invention also provides a color liquid crystal display panel capable of reducing the time required for an inspection.

To achieve the above-described advantages, a color liquid crystal display panel according to the invention includes a first substrate having data lines and scan lines arranged in a matrix, a second substrate having four-color filter segments to provide four sub-pixels forming a pixel, a frame-shaped sealing material through which the first and second substrates are bonded together, and a liquid crystal sealed in a gap surrounded by the first and second substrates and the sealing material. The data lines are drawn out of the sealing material and arranged as inspection data lines having a predetermined length. Among the inspection data lines corresponding to the four-color filter segments, at least one pair of the inspection lines for two colors sandwich one inspection data line for one color and have identical lengths.

In a preferred aspect of the above-described invention, a pair of the inspection data lines are positioned between a longer inspection data line and a shorter inspection data line than any other data lines.

In a preferred aspect of the above-described invention, a pair of the inspection data lines are longer than any other inspection data lines.

In a preferred aspect of the above-described invention, a pair of the inspection data lines are shorter than any other inspection data lines and close to the sealing material.

In a preferred aspect of the above-described invention, a pair of the inspection data lines are longer than any other inspection data lines and another pair of the inspection data lines are shorter than any other inspection data lines.

In a preferred aspect of the above-described invention, each of the inspection data lines is provided with an inspection terminal to be in contact with an inspection probe.

In a preferred aspect of the above-described invention, each of the inspection data lines is provided with a mounting terminal for mounting a semiconductor element for driving a liquid crystal.

The invention thus configured has advantages as follows. According to the invention, among the inspection data lines corresponding to the four-color filter segments, at least one pair of the inspection lines for two colors sandwich one inspection data line for one color and have identical lengths. This makes it possible to cope with increases in the number of color filter segments per pixel without increasing the space in which the inspection data lines are disposed. Further, this prevents increases in the time required to check the data lines using the inspection lines.

According to some of the preferred aspects of the above-described invention, a pair of the inspection data lines having identical lengths are close to the sealing material. This allows a reduction in the frequency at which the connector to be in contact with the inspection data lines is moved, reducing the inspection time.

According to one of the preferred aspects of the above-described invention, a pair of the inspection data lines having identical lengths are longer than any other inspection data lines and another pair of the inspection data lines are shorter than any other inspection data lines. This allows a reduction in the frequency at which the connector to be in contact with the inspection data lines is moved, reducing the inspection time.

According to one of the preferred aspects of the above-described invention, each inspection data line is provided with an inspection terminal. This makes it possible to use an inspection probe having terminals to be in contact with these inspection terminals, further reducing the inspection time.

According to one of the preferred aspects of the above-described invention, even when the number of color filter segments per pixel is increased, it is possible to mount semiconductor elements for driving a liquid crystal without increasing the space where such semiconductor elements are mounted.

DESCRIPTION OF THE PREFERRED EMBODIMENTS

Preferred embodiments of the present invention will now be described with reference to the accompanying drawings. The embodiments described below are only illustrative of color liquid crystal display panels to embody the technical idea of the invention. Therefore, the invention is not limited to the embodiments set forth herein. Other embodiments within the scope of the claims of the invention are also equally applicable.

First Embodiment

Figure 1:
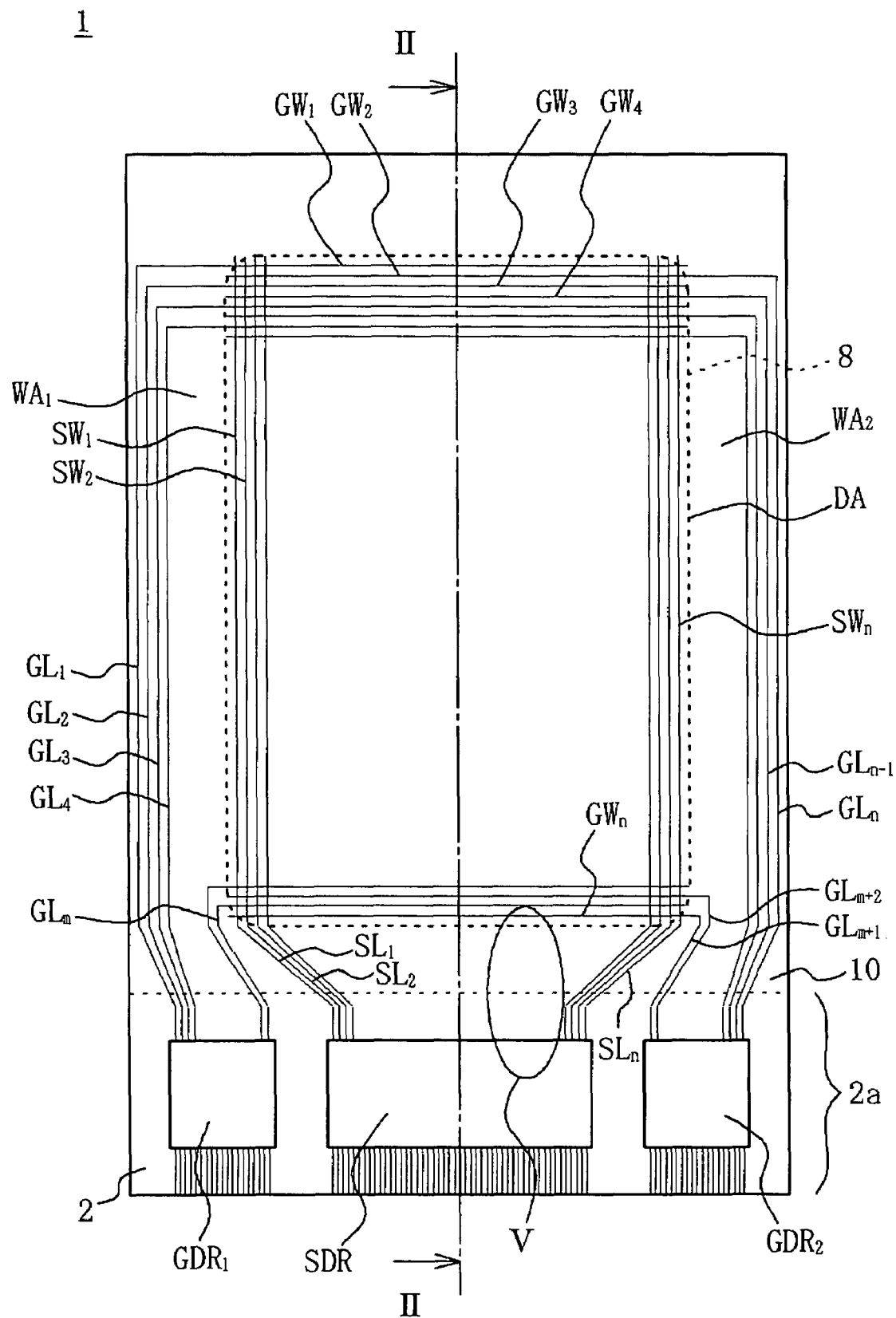
FIG. 1 is a plan view showing a color liquid crystal display panel according to an embodiment of the invention in which wiring of an array substrate can be seen through a laminated color filter substrate.
Figure 2:
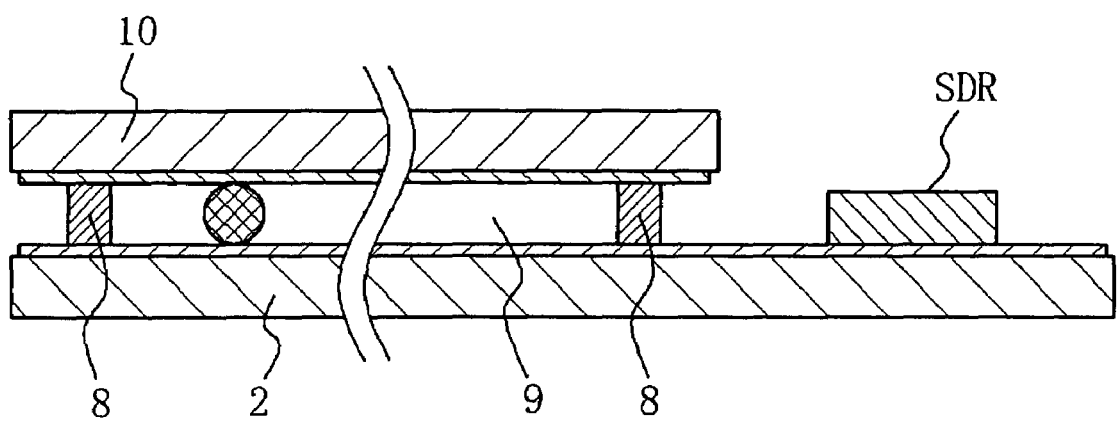
FIG. 2 is a sectional view taken along line II-II of FIG. 1.
Figure 3:
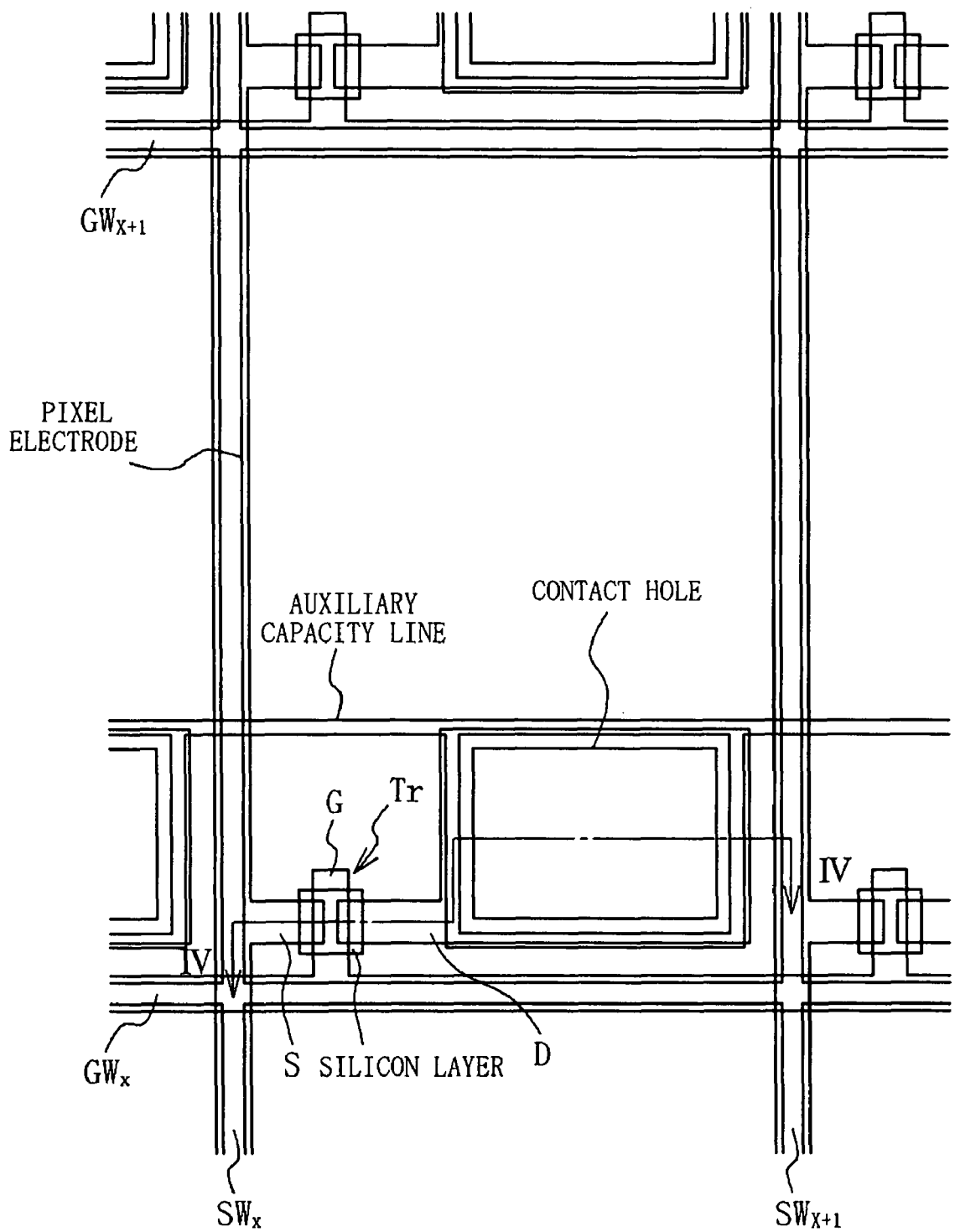
FIG. 3 is a schematic enlarged plan view showing a pixel region of FIG. 1.
Figure 4:
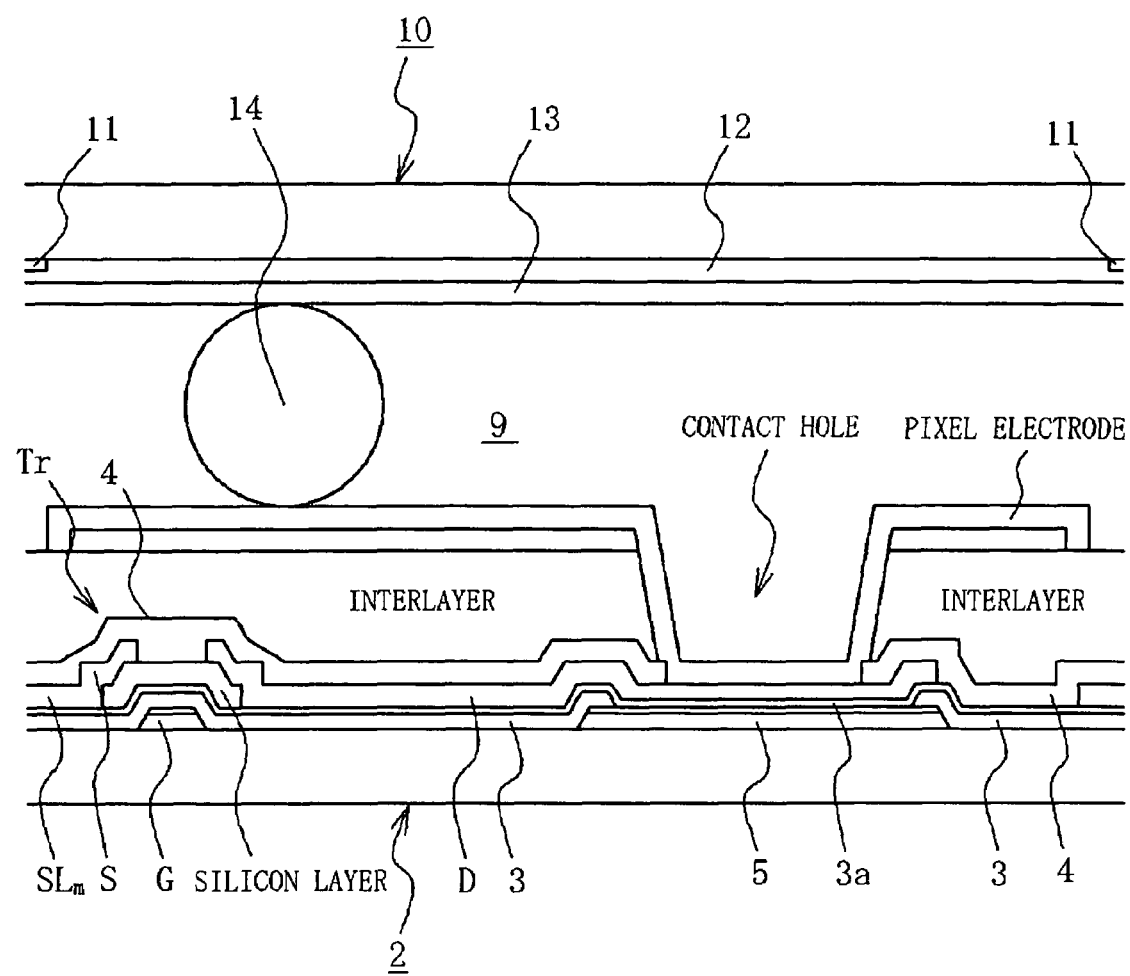
FIG. 4 is a sectional view taken along line IV-IV of FIG. 3.

FIG. 1 is a plan view showing a color liquid crystal display panel according to an embodiment of the invention in which wiring of an array substrate can be seen through a laminated color filter substrate, FIG. 2 is a sectional view taken along line II-II of FIG. 1, FIG. 3 is a schematic enlarged plan view showing a pixel region of FIG. 1, and FIG. 4 is a sectional view taken along line IV-IV of FIG. 3.

A color liquid crystal display panel 1 which is an active matrix device includes a pair of an array substrate 2 and a color filter substrate 10 that are disposed in opposed positions and made of a rectangular transparent material, such as a glass plate, as shown in FIGS. 1 and 2. A substrate larger than the color filter substrate 10 is used as the array substrate 2 so that an extended portion 2a is formed when the array substrate 2 is disposed in an opposed position to the color filter substrate 10. A frame-shaped sealing material 8 is attached to the peripheries of the array substrate 2 and the color filter substrate 10. A spacer 14 and a liquid crystal 9 are sealed in the gap surrounded by those substrates and the sealing material.

A variety of wires and the like are formed on the opposed surfaces of the array substrate 2 and the color filter substrate 10. On the color filter substrate 10, as shown in FIG. 4, there are formed a black matrix 11 provided in a matrix so as to correspond to a pixel region on the array substrate 2, a color filter 12 surrounded by the black matrix 11 and providing four colors: red (R), green (G), blue (B), and cyan (C), and a common electrode 13 provided so as to be electrically connected to an electrode on the array substrate 2 and to cover the color filter 12.

As shown FIG. 1, the array substrate 2 has on the surface thereof that faces the liquid crystal a plurality of scan lines $GW_1$ to $GW_n$ (n=2, 3, 4, . . . ), arranged at predetermined intervals in the row direction (transverse direction) of FIG. 1, and a plurality of data lines $SW_1$ to $SW_n$ insulated from the scan lines and arranged in the column direction (longitudinal direction) of FIG. 1. The data line $SW_1$ to $SW_n$ and the scan lines $GW_1$ to $GW_n$ are laid down in a matrix. A switching element Tr that is turned on based on a signal from the scan lines $GW_1$ to $GW_n$ and a pixel electrode to which a video signal from the data lines $SW_1$ to $SW_n$ is supplied via the switching element Tr are formed in each region surrounded by the scan lines $GW_1$ to $GW_n$ and the data lines $SW_1$ to $SW_n$ that intersect each other (see FIG. 3).

As the switching element Tr, a thin film transistor (TFT) is used, for example. The scan lines $GW_1$ to $GW_n$ are formed in a conductive pattern with a predetermined width and length produced on the array substrate 2, and the data line $SW_1$ to $SW_n$ are formed in a conductive pattern with a predetermined width and length produced on interlayer insulators 3, 3a (see FIG. 4), provided on the scan lines $GW_1$ to $GW_n$. As shown in FIGS. 3 and 4, for example, in a pixel surrounded by two scan lines $GW_x$ and $GW_{x+1}$ and two data lines $SW_x$ and $SW_{x+1}$ among the scan lines $GW_1$ to $GW_n$ and the data lines $SW_1$ to $SW_n$ arranged in a matrix, there are provided an auxiliary capacity line laid down between the scan lines $GW_x$ and $GW_{x+1}$ and approximately in parallel to those two scan lines, the switching element Tr including a source electrode S, a gate electrode G, a drain electrode D, and a silicon layer, and a pixel electrode that covers the region surrounded by the scan lines $GW_x$ and $GW_{x+1}$ and the data lines $SW_x$ and $SW_{x+1}$.

The scan lines $GW_1$ to $GW_n$ and the data line $SW_1$ to $SW_n$ are drawn out of a display area DA, and routed on areas around the display area so as to be connected to the IC chips in IC chip regions SDR, $GDR_1$, and $GDR_2$. The scan lines $GW_1$ to $GW_n$ are drawn onto areas outside the display area DA of the array substrate 2, that is, onto peripheral areas $WA_1$ and $WA_2$ on both sides of the display area DA. Then the scan lines $GW_1$ to $GW_n$ are connected to leads $GL_1$ to $GL_n$ (n=2, 3, 4 . . . ) for the scan lines $GW_1$ to $GW_n$, provided in the column direction (longitudinal direction) of FIG. 1. At this point, the scan lines in odd number rows, for example, $GW_1$ and $GW_3$ are drawn onto the area $WA_1$ on the left side of FIG. 1 and connected to $GL_1$, $GL_2$, to $GL_m$, respectively. On the other hand, the scan lines in even number rows, for example, $GW_2$ and $GW_4$ are drawn onto the area $WA_2$ on the right side of FIG. 1 and connected to $GL_{m+1}$, $GL_{m+2}$, to $GL_n$, respectively. By laying down the scan lines in odd number rows on the area $WA_1$ and the scan lines in even number rows on the area $WA_2$ separately as mentioned above, it is possible to achieve well-balanced wiring on the substrate.

The scan lines $GW_1$ to $GW_n$ and the data lines $SW_1$ to $SW_n$ define so-called sub-pixels. The area in which these sub-pixels are formed is the display area DA, that is, the image display section. A region surrounded by the black matrix 11 on the color filter substrate 10 opposed to the array substrate 2 is a pixel region. Four-color filters (red (R), green (G), blue (B), and cyan (C)) are formed in this pixel region.

As shown in FIG. 1, on the extended area 2a of the array substrate 2, there are provided IC chip mounting regions SDR, $GDR_1$, and $GDR_2$ on which a source driver semiconductor chip and two gate driver semiconductor chips are to be mounted, respectively. The IC chip mounting regions SDR, $GDR_1$, and $GDR_2$ are spaces having a shape matching that of the corresponding IC chip, for example, a rectangular shape. The leads $GL_1$ to $GL_m$ are inserted into the IC chip mounting regions $GDR_1$ or $GDR_2$ and each provided with a mounting terminal. The ends of these mounting terminals are extended to serve as inspection lines. Leads $SL_1$ to $SL_m$ are made of the data lines for four colors (red (R), green (G), blue (B), and cyan (C)) drawn out of one side of the sealing material 8 to serve as extended lines. Each of the extended lines is provided with a mounting terminal, and extended further from the mounting terminal. The extended portions serve as inspection data lines (hereinafter referred to as "inspection lines").

Figure 5:
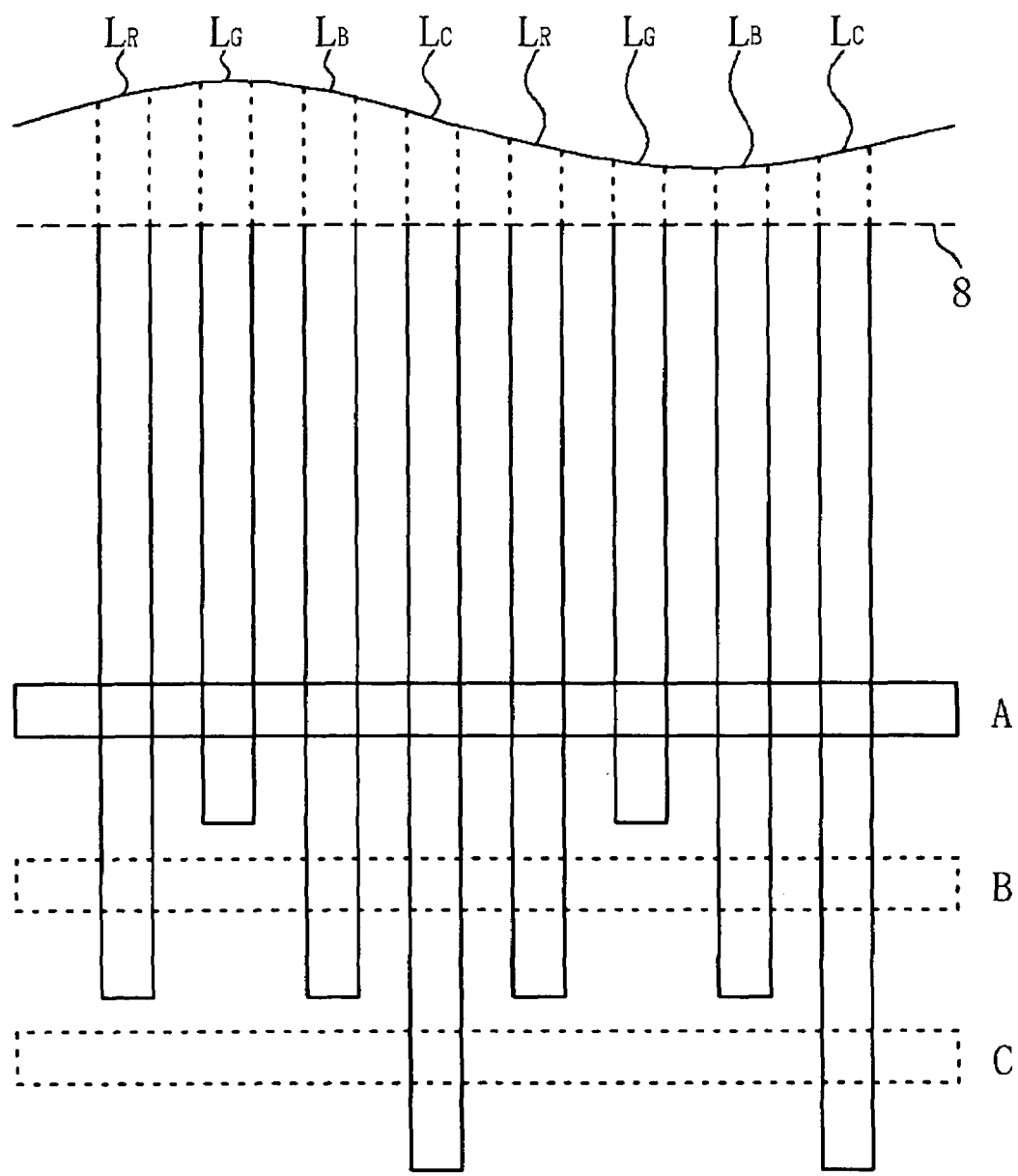
FIG. 5 is a schematic enlarged plan view of a V portion of FIG. 1.

To simplify the explanation, it is assumed that the inspection lines connected to the leads $SL_1$ to $SL_m$ are inspection lines $L_R$, $L_G$, $L_B$, and $L_C$ for red (R), green (G), blue (B), and cyan (C). It is also assumed that the voltage to the gate lines is always on during an inspection to be described below. Description on the inspection associated with the gate lines will be omitted. FIG. 5 is an enlarged plan view of a V portion of FIG. 1. The inspection lines $L_R$, $L_G$, $L_B$, and $L_C$ are provided with the mounting terminals for mounting a liquid crystal drive semiconductor element, but those mounting terminals are not shown in FIG. 5.

Any two lines of the inspection lines $L_R$, $L_G$, $L_B$, and $L_C$ for red (R), green (G), blue (B), and cyan (C) form at least one pair of inspection lines that have identical lengths. As shown in FIG. 5, the red (R) inspection line $L_R$ and the blue (B) inspection line $L_B$ are formed so as to have identical lengths, the green (G) inspection line $L_G$ is formed so as to be shorter than the pair of the inspection lines, and the cyan (C) inspection line $L_C$ is formed so as to be longer than the pair of the inspection lines. That is, $L_G < L_R = L_B < L_C$. The red (R) and blue (B) inspection lines $L_R$ and $L_B$ are interposed between the green (G) and cyan (C) inspection lines $L_G$ and $L_C$ and form the pair of the inspection lines having identical lengths.

The inspection is conducted as described below with a connector (not shown) in contact with the inspection lines. Note that all the scan lines and a connector are connected in the same manner as in related-art inspection methods.

A connector (not shown) is initially disposed at the A position. Positioning the connector at this position causes the connector to touch all the inspection lines $L_R$, $L_G$, $L_B$, and $L_C$, lighting all the pixels. If there are any pixels staying out, it can be assumed that a data line is broken. Therefore, it is possible to detect whether or not there is a break in any data line in this lighting inspection for all colors. Subsequently, when the connector is moved to the B position, the connector touches the red (R) inspection line $L_R$, the blue (B) inspection line $L_B$, and cyan (C) inspection line $L_C$, lighting the red, blue, and cyan pixels. At this point, when the green pixels are lit, it can be assumed that the data line for green pixels is shorted with the data line(s) for the red and/or blue pixels. Further, when the connector is moved from the B position to the C position, the connector touches the cyan (C) inspection line $L_C$ alone, lighting the cyan pixels alone and keeping other pixels out. At this point, if pixels of another color, that is, the red or blue pixels are lit, it can be assumed that the data line for the red or blue pixels is shorted with the data line for cyan pixels.

According to the abovementioned configuration, even when the number of color filter segments is increased, there is no need to increase the space where the inspection lines are provided to check the wiring condition of the data lines on the display panel. Further, the connector is moved to only the three positions of A to C, allowing the time required for the inspection to be reduced.

Figure 6:
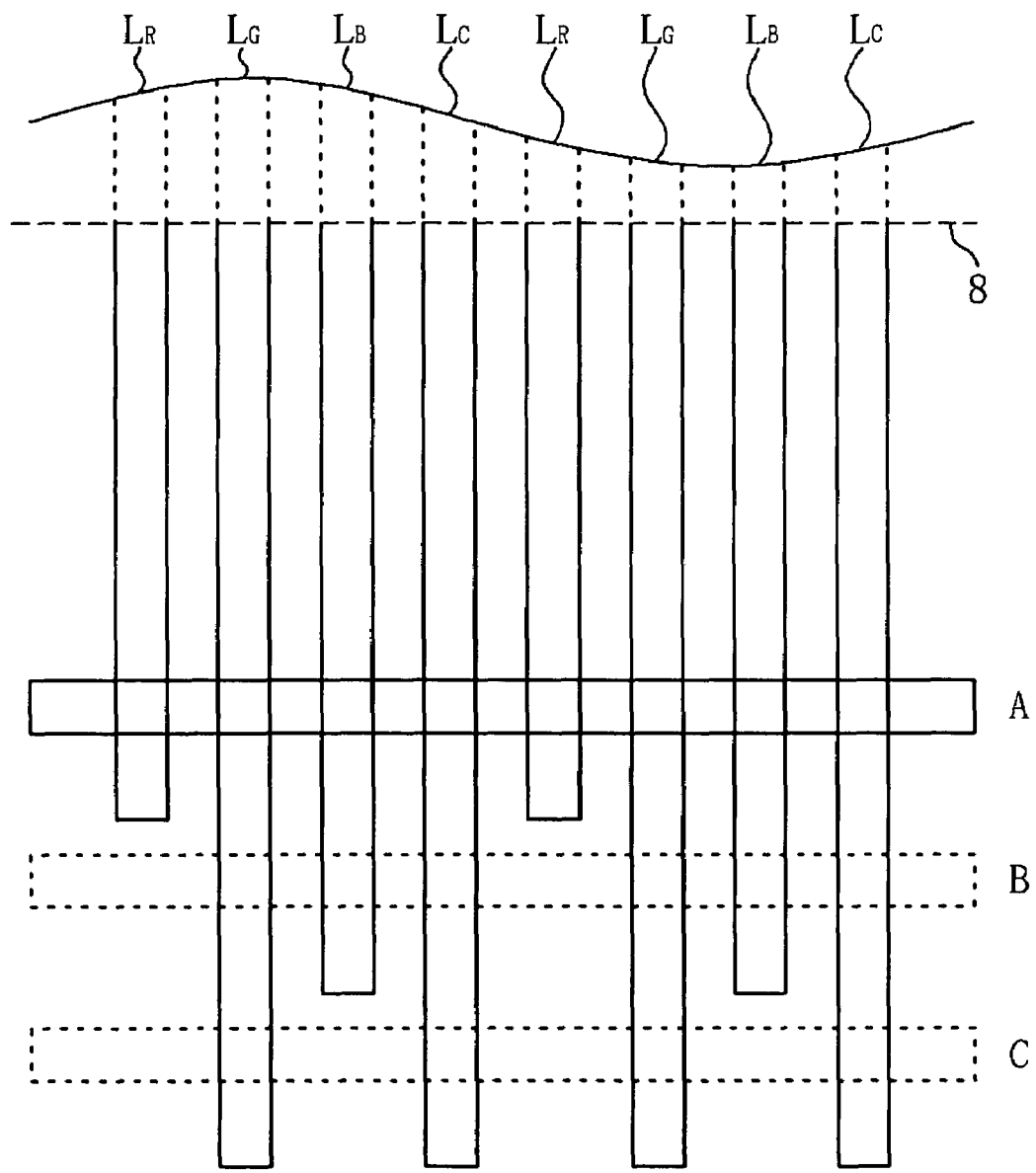
FIG. 6 is a schematic enlarged plan view of a first modification of a wiring structure of FIG. 5.

FIG. 6 illustrates a first modification of the inspection lines shown in FIG. 5. Of the inspection lines $L_R$, $L_G$, $L_B$, and $L_C$, the green (G) inspection line $L_G$ and the cyan (C) inspection line $L_C$ form a pair of the inspection lines that have identical lengths. The blue (B) inspection line $L_B$ is formed so as to be shorter than the pair of the inspection lines, and the red (R) inspection line $L_R$ is formed so as to be shorter than the blue (B) inspection line $L_B$. That is, $L_R<L_B<L_G=L_C$. The pair of the inspection lines are extended furthest among the inspection lines.

In this inspection method according to the first modification, the connector is initially disposed at the A position. Positioning the connector at this position causes the connector to touch all the inspection lines $L_R$, $L_G$, $L_B$, and $L_C$, lighting all the pixels. If there are any pixels staying out, it can be assumed that a data line is broken. Subsequently, when the connector is moved to the B position, the connector touches the green (G) inspection line $L_G$, the blue (B) inspection line $L_B$, and cyan (C) inspection line $L_C$, lighting the green, blue, and cyan pixels. At this point, when the red pixels are lit, it can be assumed that the data line for red pixels is shorted with the data line for the green or cyan pixels. Further, when the connector is moved to the C position, the connector touches the green (G) and cyan (C) inspection lines $L_G$ and $L_C$, lighting the green and cyan pixels and keeping other pixels out. At this point, if the blue pixels are lit, it can be assumed that the data line for blue pixels is shorted with the data line(s) for green and/or cyan pixels.

Figure 7:
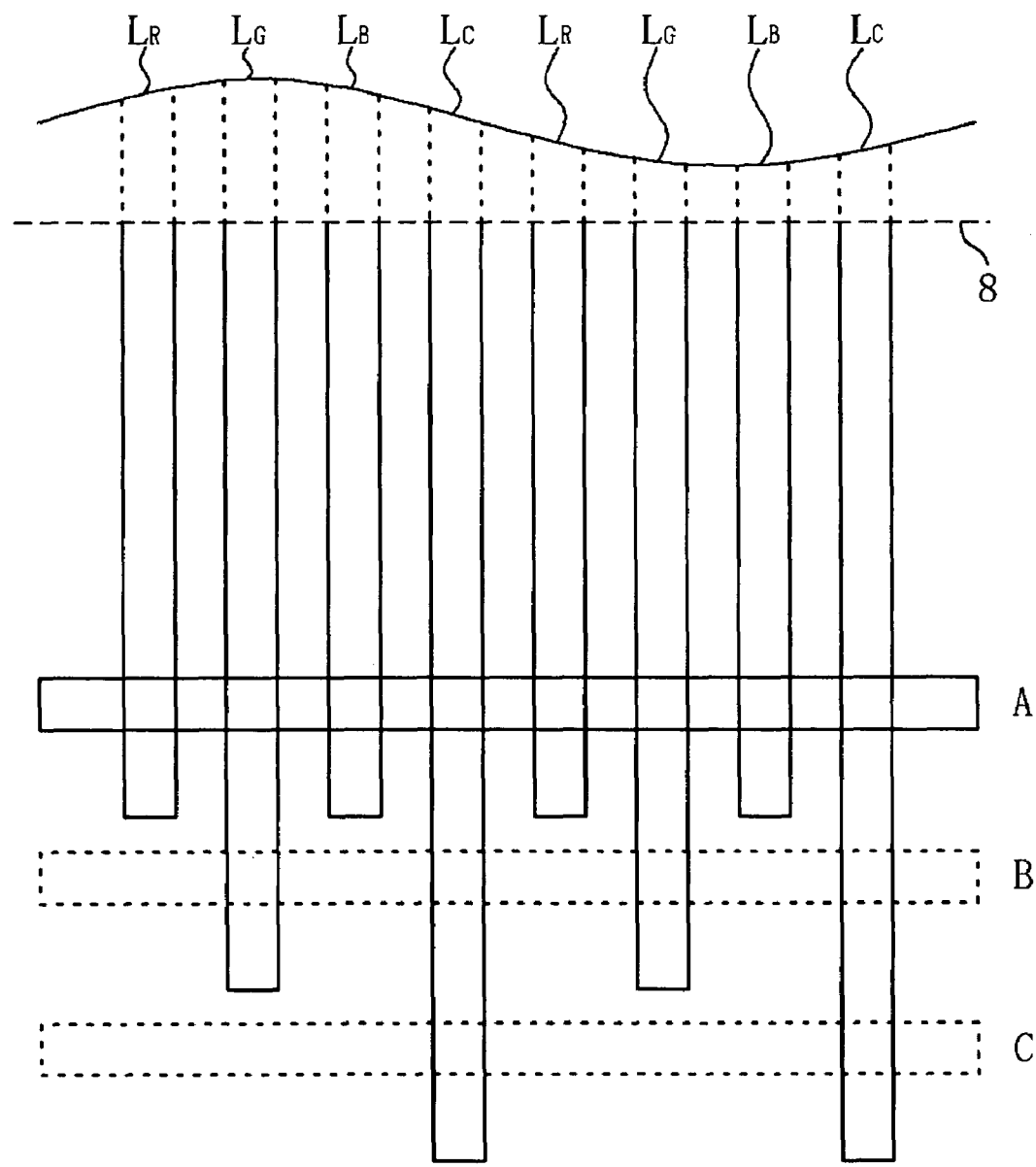
FIG. 7 is a schematic enlarged plan view of a second modification of a wiring structure of FIG. 5.

FIG. 7 illustrates a second modification of the inspection lines shown in FIG. 5. Of the red (R), green (G), blue (B), and cyan (C) inspection lines $L_R$, $L_G$, $L_B$, and $L_C$, the red (R) inspection line $L_R$ and the blue (B) inspection line $L_B$ form a pair of the inspection lines that have identical lengths. Other inspection lines, namely, the green (G) inspection line $L_G$ and the cyan (C) inspection line $L_C$, are formed so as to be sequentially longer than the pair of the inspection lines. That is, $L_R=L_B<L_G<L_C$. Therefore, the pair of the inspection lines are made shortest among the inspection lines.

In this inspection method according to the second modification, a connector is initially disposed at the A position. Positioning the connector at this position causes the connector to touch all the inspection lines $L_R$, $L_G$, $L_B$, and $L_C$, lighting all the pixels. If there are any pixels staying out, it can be assumed that a data line is broken. Subsequently, when the connector is moved to the B position, the connector touches the green (G) inspection line $L_G$ and cyan (C) inspection line $L_C$, lighting the green and cyan pixels. At this point, when the red or blue pixels are lit, it can be assumed that the data line for red or blue pixels is shorted with the data line for green or cyan pixels. Further, when the connector is moved to the C position, the connector touches the cyan (C) inspection line $L_C$, lighting the cyan pixels. At this point, if the red or blue pixels are lit, it can be detected that the data line for the cyan pixels is shorted with the data line for red or blue pixels. Further, it can be assumed that the data line for the red or blue pixels that have been lit with the connector positioned at the B position and are not lit with the connector positioned at the C position is shorted with the data line for green pixels. However, in an actual inspection, when it is acknowledged that the red or blue pixels are lit with the connector positioned at the B position, this substrate is sorted out as a nonconforming item. Therefore, it is not required to conduct an inspection at the C position in order to check if the substrate is a nonconforming item or not.

Figure 8:
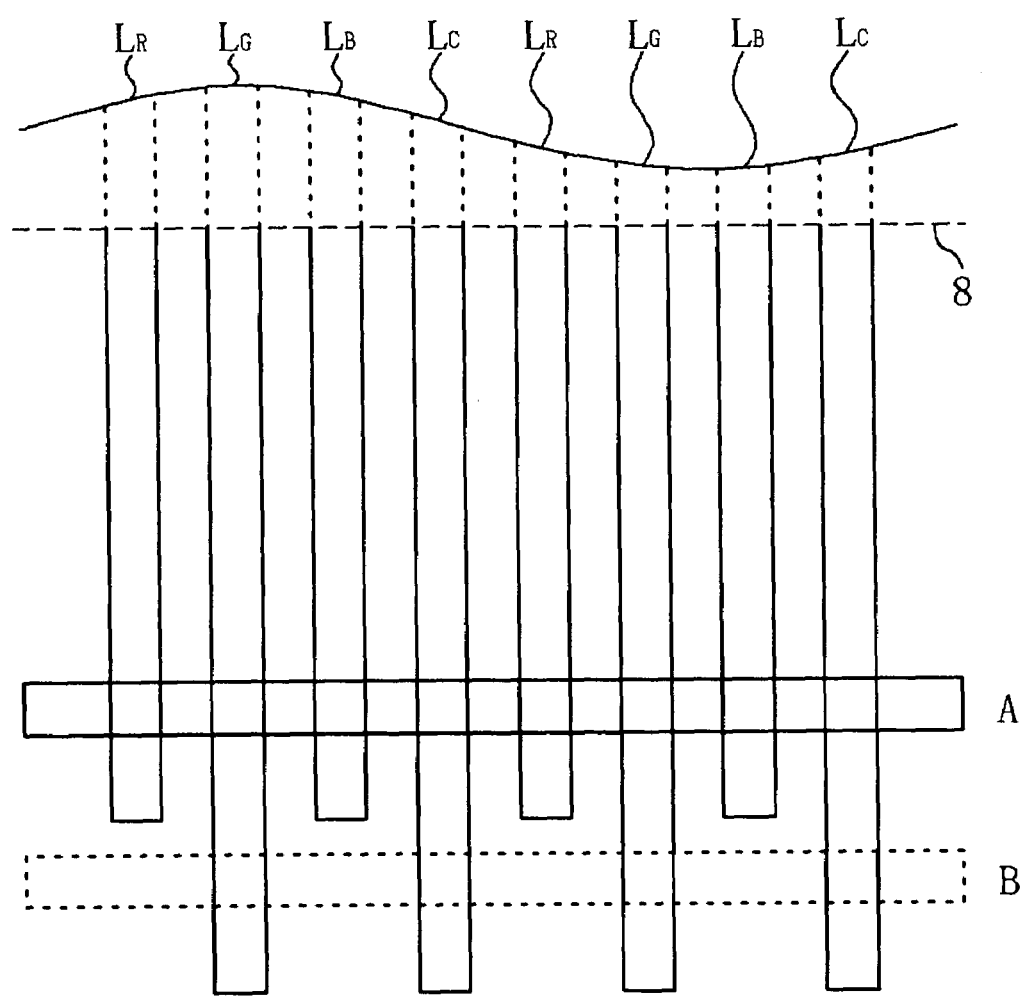
FIG. 8 is a schematic enlarged plan view of a third modification of a wiring structure of FIG. 5.

FIG. 8 illustrates a third modification of the inspection lines shown in FIG. 5. Of the red (R), green (G), blue (B), and cyan (C) inspection lines $L_R$, $L_G$, $L_B$, and $L_C$, the red (R) and blue (B) inspection lines $L_R$ and $L_B$, and the green (G) and cyan (C) inspection lines $L_G$ and $L_C$ form two pairs of the inspection lines that have identical lengths. Of the two pairs of the inspection lines, the pair of the inspection lines consisting of the green (G) and cyan (C) inspection lines $L_G$ and $L_C$ are formed so as to be longer than the other pair of the inspection lines. That is, $L_R=L_B<L_G=L_C$.

In this inspection method according to the third modification, the connector is initially disposed at the A position. Positioning the connector at this position causes the connector to touch all the inspection lines $L_R$, $L_G$, $L_B$, and $L_C$, lighting all the pixels. If there are any pixels staying out, it can be assumed that a data line is broken. Subsequently, when the connector is moved to the B position, the connector touches the green (G) inspection line $L_G$ and cyan (C) inspection line $L_C$, lighting the green and cyan pixels. At this point, when the red or blue pixels are lit, it can be assumed that the data line for red or blue pixels is shorted with the data line for green or cyan pixels. In this inspection, it is only required to move the connector to the two positions.

Figure 9:
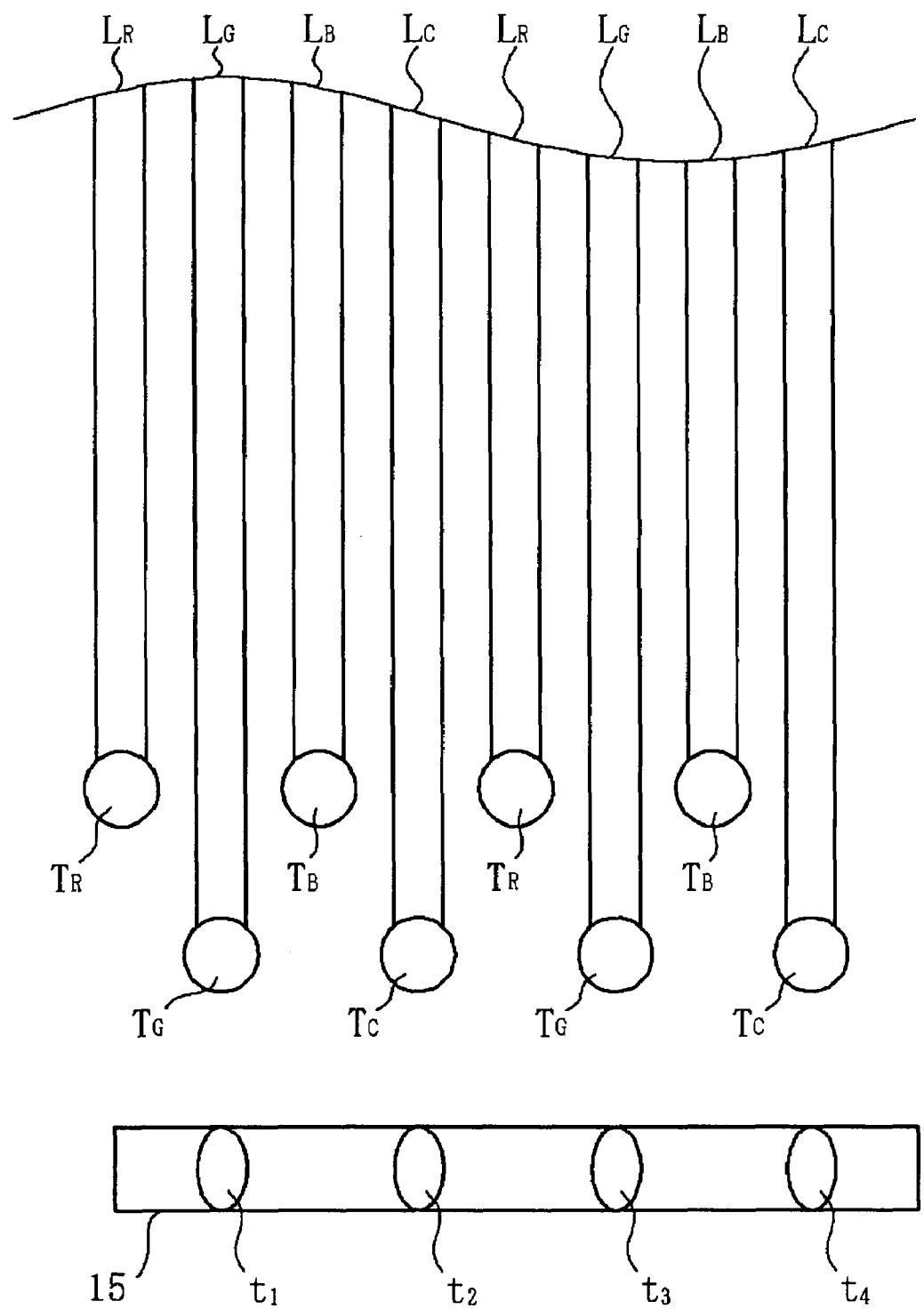
FIG. 9 is a schematic enlarged plan view of a fourth modification of a wiring structure of FIG. 5.
Figure 10:
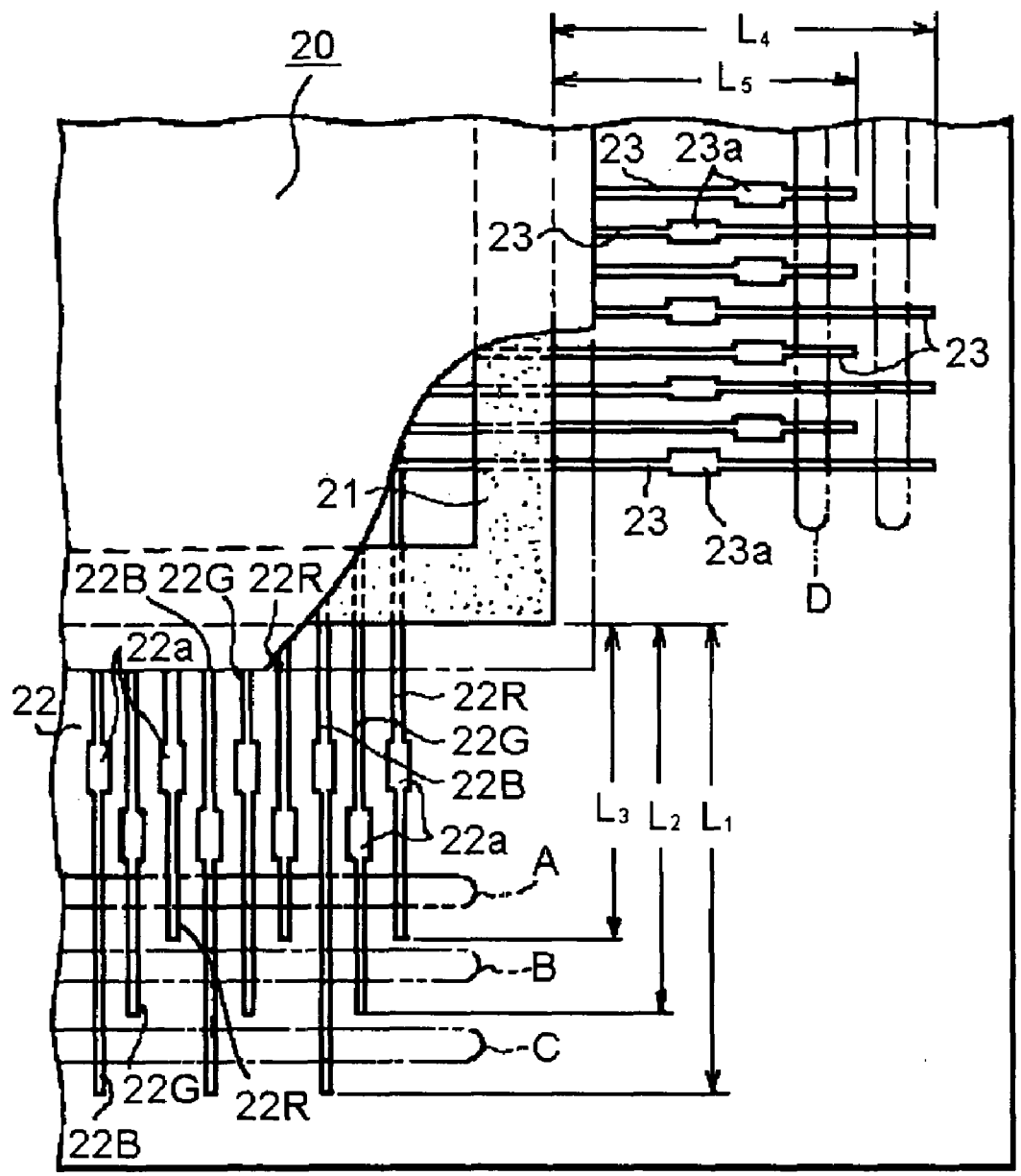
FIG. 10 is an enlarged plan view of terminals in a related-art liquid crystal display panel.
Figure 11:
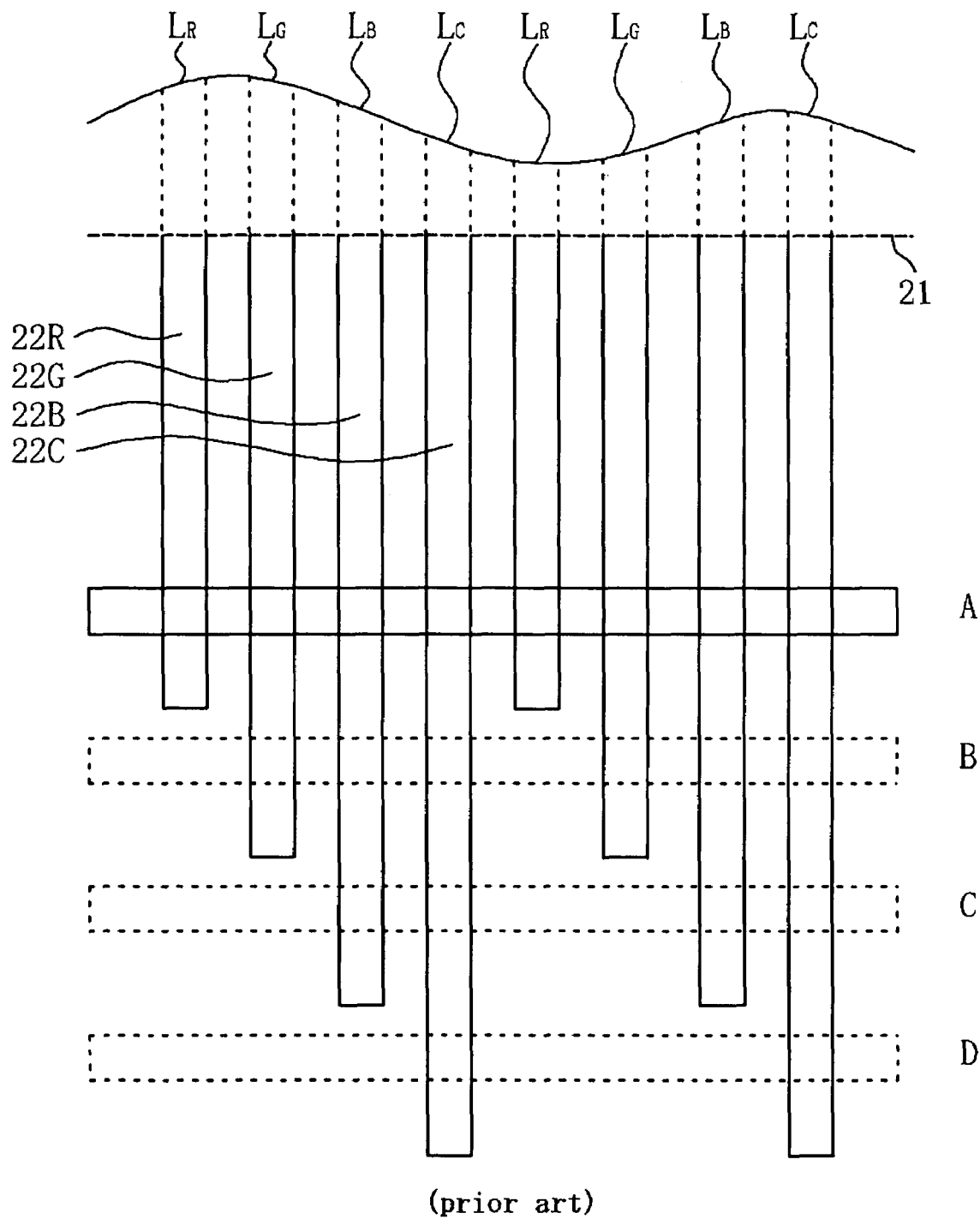
FIG. 11 is a schematic plan view showing a substantial part of FIG. 10.

FIG. 9 illustrates a fourth modification of the inspection lines shown in FIG. 5. An inspection terminal is formed at the end of each of the red (R), green (G), blue (B), and cyan (C) inspection lines $L_R$, $L_G$, $L_B$, and $L_C$ shown in FIG. 8.

Providing the inspection terminals $T_R$, $T_G$, $T_B$, and $T_C$ at the end of the inspection lines $L_R$, $L_G$, $L_B$, and $L_C$, respectively, allows use of an inspection probe 15 configured to have terminals to be in contact with these inspection terminals. This probe is formed of a strip-shaped conductor having the terminals $t_R$, $t_G$, $t_B$, and $t_C$ provided at the same intervals as the inspection terminals. In this inspection method according to the fourth modification, the presence/absence of a break in any of the data lines is initially checked by letting the connector touch all the inspection lines $L_R$, $L_G$, $L_B$, and $L_C$. Subsequently, the inspection probe 15 is caused to touch the red (R) and blue (B) inspection lines $L_R$, $L_B$, $L_R$, and $L_B$. At this point, if the green or cyan pixels are lit, it can be assumed that the green or cyan data line is shorted with the red or blue data line. This inspection can also be conducted by letting the inspection probe 15 touch the green (G) and cyan (C) inspection lines $L_G$, $L_C$, $L_G$, and $L_C$. At this point, if the red or blue pixels are lit, it can be assumed that a short circuit has occurred in a similar manner. While this inspection can be omitted by using results from the previous inspection, conducting both inspections helps achieve more accurate results.

The invention claimed is:
1. A color liquid crystal display panel comprising:
a first substrate having data lines and scan lines arranged in a matrix;
a second substrate having four-color filter segments including color for red (R), green (G), blue (B), and cyan (C) to provide four sub-pixels forming a pixel;
a frame-shaped sealing material through which said first and second substrates are bonded together; and
a liquid crystal sealed in a gap surrounded by said first and second substrates and said sealing material;
said data lines being drawn out of said sealing material and arranged as inspection data lines having a predetermined length, and
among said inspection data lines corresponding to said four-color filter segments, at least one pair of said inspection lines for two colors sandwiching one inspection data line for one color and having identical lengths, and the inspection data lines have three different lengths.
2. The color liquid crystal display panel according to claim 1, wherein a pair of said inspection data lines are positioned between a longer inspection data line and a shorter inspection data line than any other data lines.

3. The color liquid crystal display panel according to claim 1, wherein a pair of said inspection data lines are longer than any other inspection data lines.

4. The color liquid crystal display panel according to claim 1, wherein a pair of said inspection data lines are shorter than any other inspection data lines and close to said sealing material.

5. The color liquid crystal display panel according to claim 1, wherein a pair of said inspection data lines are longer than any other inspection data lines and another pair of said inspection data lines are shorter than any other inspection data lines.

6. The color liquid crystal display panel according to claim 1, wherein each of said inspection data lines is provided with an inspection terminal to be in contact with an inspection probe.

7. The color liquid crystal display panel according to claim 1, wherein each of said inspection data lines is provided with a mounting terminal for mounting a semiconductor element for driving a liquid crystal.

* * * * *